United States Patent [19]

Gaugel et al.

[11] Patent Number: 4,774,636

[45] Date of Patent: Sep. 27, 1988

[54] AUTOMOTIVE HEADLAMP - REFLECTOR COMBINATION

[75] Inventors: Manfred Gaugel, Fürstenfeldbruck; Jürgen Vom Scheidt, Taufkirchen, both of Fed. Rep. of Germany

[73] Assignee: Patent Treuhand Gesellschaft fur elektrische Gluhlampen mbH, Munich, Fed. Rep. of Germany

[21] Appl. No.: 121,927

[22] Filed: Nov. 18, 1987

[30] Foreign Application Priority Data

Dec. 8, 1986 [DE] Fed. Rep. of Germany ....... 3641852

[51] Int. Cl.[4] .................................................. B60Q 1/00

[52] U.S. Cl. ........................................ 362/61; 362/217; 362/263; 362/310

[58] Field of Search .................. 313/113; 362/61, 217, 362/222, 226, 263, 296, 303, 310

[56] References Cited

U.S. PATENT DOCUMENTS 3,721,850 3/1973 Giller .................................. 313/114
4,594,529 6/1986 de Vrijer .............................. 313/571
4,626,734 12/1986 Greiler ............................ 313/113 X

FOREIGN PATENT DOCUMENTS 2123541 2/1984 United Kingdom .

*Primary Examiner*—Stephen F. Husar
*Attorney, Agent, or Firm*—Frishauf, Holtz, Goodman & Woodward

[57] ABSTRACT

To retain a double-ended elongated discharge lamp in position in an automotive headlamp, and prevent breakage or loosening of a connection of a base of the lamp at one end with the apex (5) of the reflector, a lamp retention and guide arrangement (14) including narrow strips extending radially from a sleeve (18) towards the inner wall of the reflector (1) is located, the sleeve receiving the forward end of the lamp. Preferably, the forward end of the is jacketed by an inner forward sleeve element (18), to which also the forward lamp connection (20) is attached, to provide for electrical connection to the forward end of the lamp, for example by a cable (23) extending in a groove or duct of one of the strips (16), or by the strips themselves, if they are made of metal.

19 Claims, 4 Drawing Sheets

AUTOMOTIVE HEADLAMP - REFLECTOR COMBINATION

Reference to related publications:
U.S. Pat. No. 3,721,850
U.S. Pat. No. 4,594,529,
both incorporated herein by reference.
British Pat. No. 2,123,541, Szekacs;
U.S. Ser. No. 005,685, filed Jan. 21, 1987, GAUGEL, now U.S. Pat. No. 4,722,039, the disclosure of which is hereby incorporated by reference.

The present invention relates to an automotive headlamp, and more particularly to an automotive headlamp - reflector combination utilizing a double-ended discharge lamp.

BACKGROUND

Various types of lamp - reflector combinations using discharge lamps rather than incandescent lamps are known. Discharge lamps have the advantage of high light output and long life. U.S. Pat. No. 3,721,850, Giller, describes a lamp in which a single-ended discharge lamp is used, located similar to an incandescent lamp.

It has then been proposed to utilize double-ended discharge lamps, that is, lamps having a pinch or press seal at both ends with an intermediate bulb-like extended discharge space. This provides for more reliable ignition of the lamp, particularly when it is still hot. Further, it provides for better insulation between the current supply leads, which are now separated from each other by the length of the lamp. Such a structure is shown, for example, in British Pat. No. 2,123,541 and in the referenced application U.S. Ser. No. 005,685, filed Jan. 21, 1987, Gaugel, now U.S. Pat. No. 4,722,039. The structure shown in the referenced application, assigned to the assignee of the present application, is particularly suitable.

Optimal utilization and distribution of the available light, and particularly if a shield is used to provide a depressed beam, can be obtained by locating the lamp axially with respect to the reflector, and to locate the lamp itself in a base which is passed through an opening in the reflector. The current supply lead to the lamp at the self-supported forward end—that is, the end remote from the apex of the reflector, and leading to the forward pinch seal, is carried along the side of the discharge vessel to the single base. The requisite spacing between the electrical terminals in the base can be selected to be much greater than in single-ended discharge lamps, since the spacing of the terminals within the base is independent of the size of the pinch or press seals of the lamp or light emitting element as such.

When a lamp having a self-supported forward end is used in automotive headlamps, it has been found that the vibrations and shocks to which the lamp is exposed in use in an automotive vehicle causes difficulty in maintenance of the light unit of the lamp within the reflector. The base typically of ceramic, may break due to material failure.

THE INVENTION

It is an object to provide a light source—reflector combination headlamp, using a double-ended discharge lamp, which is essentially immune to the rough operating conditions encountered in automotive use, so that an overall improved lamp is provided.

Briefly, a lamp retention and guide or holding element is provided, rigidly secured to the reflector and positioned to receive the end of the discharge lamp which is closer to the forward pinch or press seal, that is, which extends into the reflector space. This element retains and secures the forward end of the lamp in position and prevents free movement or cantilevered swings or oscillation thereof, for example under conditions of vibrations of the motor vehicle to which it is attached.

The arrangement has the advantage that the elongated discharge lamp is rigidly secured in position at both ends, so that no mechanical bending stresses are transferred through the base.

In accordance with a feature of the invention, the retention and guide arrangement is so constructed that, at the same time, expansion due to heating of the lamp can be compensated for. Thus, the structure of the invention reliably prevents transfer of vibration to the light source unit while, simultaneously, compensating for dimensional changes thereof due to changes in temperature.

In the specification and claims to follow, reference will be made to a "rearward" and "forward" end; the "rearward" end of the lamp is that one which is closest to the apex of the reflector, whereas the "forward" end of the lamp is that one closest to the light emission opening of the reflector which, typically, is closed off by a lens, a light distribution element or the like.

To permit easy exchange of the light source or lamp unit, it is desirable to so construct the retention element that the lamp can be readily threaded or pushed thereinto. In accordance with a preferred feature of the invention, further, the current supply to the forward pinch seal can be carried to the lamp via the lamp retention and guide element. This substantially increases the spacing between the current supply leads with respect to the prior art. Additionally, since only one terminal is needed at the rearward portion of the lamp, the diameter of the base can be reduced, so that a larger effective reflector surface becomes available which, in turn, permits a higher light output. Alternatively, the reflector surface and thus the dimension of the lamp—reflector unit can be made smaller without loss of light output.

DRAWINGS

DETAILED DESCRIPTION

Figure 1:
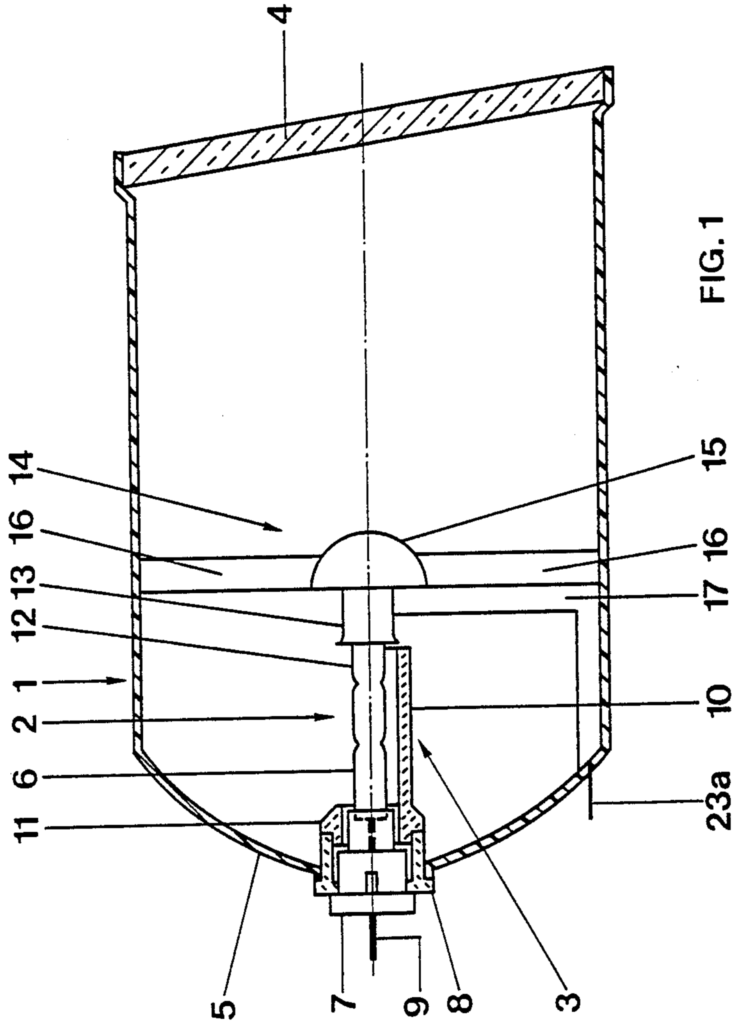
FIG. 1 is a side view, partly in section, of the lamp-reflector combination.

The lamp unit of FIG. 1, essentially, is formed of the combination of a reflector 1 and a double-ended or double-sided high-pressure discharge lamp 2 and a shielding element 3. The lamp 2, combined with the shielding element 3, can be constructed as described in the referenced application Ser. No. 005,685, filed Jan 21, 1987, now U.S. Pat. No. 4,722,039, Gaugel.

The reflector 1 is made of plastic, of for example about 5 cm height, and is formed with a paraboloid-shaped rear surface made of highly heat resistant plastic material, such as polyetherimide or polyphenylsulfide. The light emission opening of the reflector is covered with a lens or distribution disk 4 of glass or plastic, for example an acrylic-type plastic. The apex 5 of the reflector has an opening located in the optical axis thereof. The discharge lamp 2 is introduced into the space forward of the apex of the reflector through an opening therein, along the optical axis thereof. The discharge lamp itself is a standard well known metal halide discharge lamp having a power rating of, for example, 35 W. The lamp has an axial length of 32 mm, and retains a fill of mercury and noble gas, and additives of halides of the metals Na and Sc; alternatively, other metals such as Na, Tl and Sn can be used.

The rearward press seal 6 of the lamp, adjacent the apex 5 of the reflector, is retained within a cylindrical base portion 7 of plastic or ceramic material, secured into the opening of the reflector apex 5. A sleeve 8 of temperature resistant plastic material surrounds the base 7 and seals the opening against ingress of moisture, humidity, splashed or sprayed water or the like, and any other contaminants. The current supply lead 9, led out of the lamp from the rear press seal 6, is carried centrally through the base 7. The base 7 is retained, compressed against the apex 5 of the reflector, by means of a pair of spring bails, not shown, and of any suitable and standard construction.

The shielding element 3 is made of electrically insulating material, such as ceramic, or a mica composition, for example known under the tradename "Micaver". It is formed with a trough or groove 10, along the length of the tube, having its concave side facing the lamp. The groove or trough extends about an angle of 165°. The groove 10 is continuously circumferential in the region of the rearward pinch seal, to form a ring-shaped holding element 11 which is seated on the sleeve 8.

Figure 2:
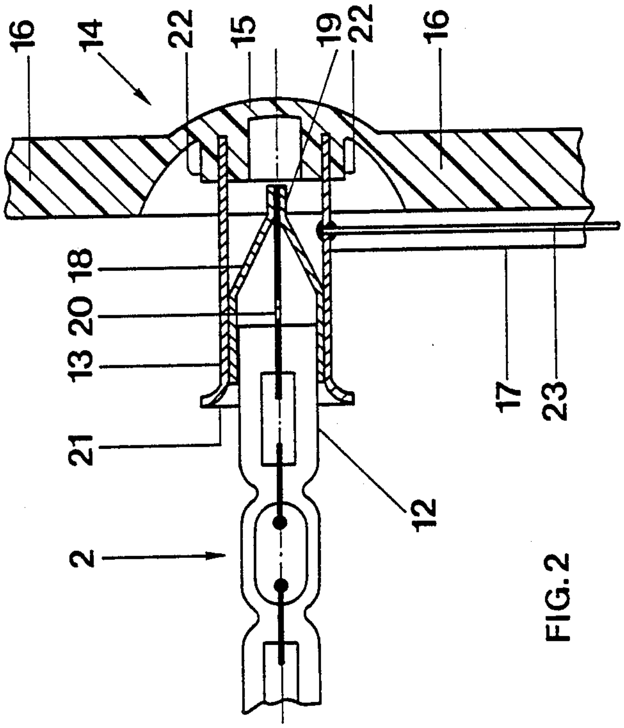
FIG. 2 is an enlarged cross-sectional view of the headlamp in the region of the forward pinch or press seal of the lamp.

The forward pinch seal 12 of the discharge lamp 2 is guided in an outer cylindrical sleeve 13, having an inner diameter of 5 mm, which sleeve is rigidly connected via a holding arrangement 14 with the reflector 1. The connection between the holding arrangement 14 and the reflector, or between the sleeve 13 and the holding arrangement 14 can be, for example, by ultrasonic heating. The holding and guiding arrangement 14 is formed as a strip 16 which extends transversely across the reflector, and is formed with a central cup-like arrangement 15 which, simultaneously, forms a direct beam light stop, well known in prior art. The cup-shaped element 15, which can have essentially part-spherical shape, as best seen in FIG. 2, is so dimensioned that any direct light emitted from the light source 2 towards the light exit opening or lens 4 is shaded, and reflected back towards the reflector. Additional shading of the light emitted through the lens 4 by the holding arrangement 14 is thus effectively prevented.

FIG. 2 illustrates the attachment of the lamp 2 in the holding 14 in greater detail. The end of the forward pinch seal 12 of the lamp 2 is surrounded by an inner cylindrical sleeve 18, made for example of metal, which extends forwardly in the direction of the lens or light distribution element 4. The projecting portion, extending towards the forward side, is conically reduced to a tip 19. The current supply lead 20, extending from the forward pinch seal, terminates about at the apex or conical tip 19 and is welded thereto. The conical tip 19 facilitates insertion of the lamp 2 into the outer sleeve 13. Outer sleeve 13 is likewise made of metal, and tightly surrounds the inner sleeve 18 in the region of the pinch seal 12. The inner sleeve 18 is longitudinally slit, to obtain a spring action. The slit is not visible in the drawings. This insures resilient and reliable electrical contact engagement between the sleeves 13 and 18, while permitting thermal expansion of the lamp in operation. Insertion of the lamp into the outer sleeve 13 is additionally facilitated by an outward flare 21 formed at the end of the sleeve 13.

The end of sleeve 13 remote from the lamp 2 has the part-spherical cap 15 secured thereto. Cap 15 is formed at its inner concave side with a ring-shaped bead 22, which has a circular slot formed therein matching the sleeve 13. The sleeve 13 is inserted in the slot, and secured to the bead 22, for example by high-frequency welding. The cap 15 and the strip 16 are made of plastic material.

The electrical connection to the current supply lead 20 of the lamp is formed by a cable 23 which is fitted within a cable groove or channel or a duct 17 formed on the strip 16. Cable 23 terminates on the sleeve 13 and is electrically and mechanically connected thereto by a suitable connection, for example brazing. Thus, the forward connection to the current supply lead 20, passing through the forward pinch seal 12, can be substantially spaced from the current supply lead 9 and the connection to the rearward pinch seal, since the forward connection can be brought out at a position 23*a* remote from the base of the lamp (see FIG. 1). Thus, excellent high-voltage insulation between the two current supply leads can be obtained. This is particularly important if the lamp is to be re-ignited while it is still hot. This requires voltages of about 15 kV.

The holder 14 and the cap 15 may be made entirely or partly of metal, which, then, can itself provide for electrical connection to the sleeve 13. Especially the strip 16 may be made of metal, for example connected to the sleeve 13, with a cap similar to the cap 15 being molded thereon for control of the light beam.

The lamp, as well known, is preferably operated with high-frequency current, for example of about 10 kHz. The "hot" current supply connection is preferably connected to the terminal 9, and hence to the rearward pinch seal 6. The current supply lead 20 to the forward pinch seal 12 can then be connected to ground or chassis.

Figure 4:
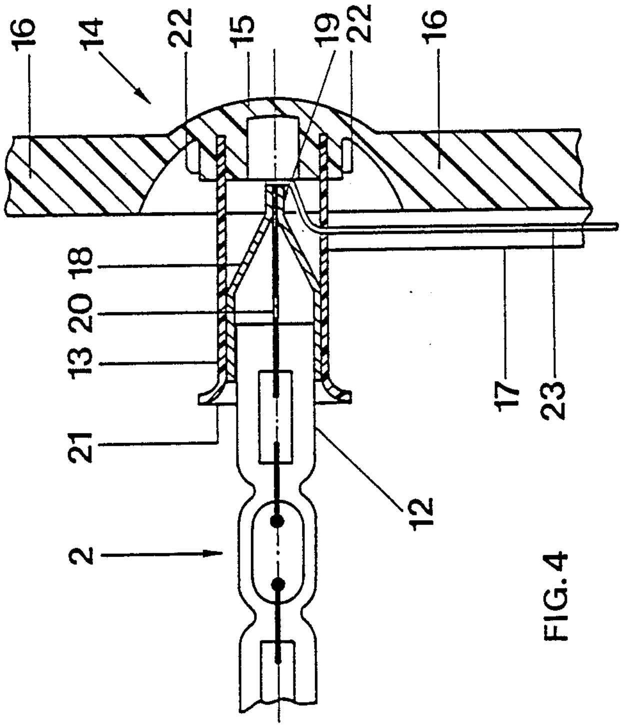
FIG. 4 is a view similar to FIG. 2, in which the reception element for the lamp is made of plastic and the electrical current supply connected to the pinch seal of the lamp.

It has previously been proposed to construct lamps of this type which include heater wires. Preheating the lamp reduces the starting time. Heater connections for heaters, which typically are only at 12 V in an automotive use, are located within the base 7. In such constructions, the base 7 is partly made of metal. If this embodiment for the lamp is used, it is desirable to place the high-voltage supply terminal which is ground or chassis to the rear pinch seal connection, that is, to terminal 9, while the "hot" supply line for the lamp is connected to the current supply which feeds the forward pinch seal 12 and its current supply connection 20. To provide sufficient insulation capability, the sleeve 13 and the holder therefor, that is, strip 16 and the cap 15, are then preferably made of non-conductive material, such as ceramics or plastics. The electrical connection then must extend through an opening in the sleeve 13 to the current supply lead 20. A suitable connection is then made between the cable 23 and the current supply lead 20 and/or the extending metal sleeve 19 (FIG. 4).

The present invention is applicable to various types of headlight constructions; it can be used also with elliptical headlights made either of sheet metal or of plastic, in which the shielding arrangement is not secured directly to the lamp, but rather in the second focal point. The second focal point is positioned approximately midway between the lamp and the light emission opening, customarily closed with the lens or light distribution element 4. The current supply connection to the forward pinch seal 12 of the lamp along the longitudinal extent of the lamp would lead to substantial shadows and to an undesired non-homogeneous light distribution. Carrying the return conductor or second conductor from the forward pinch seal along the lamp towards the rear position is known and used in some double-ended discharge lamps. Rather than returning the second current supply connection from the forward pinch seal towards the base of the lamp, the forward lamp connection 20 extending from the forward pinch seal 12 of the lamp is carried forwardly into a sleeve, as described in connection with FIGS. 1 and 2. The holder arrangement can then be formed by three small strips, which extend radially from the sleeve 13 and which are secured to the inner wall of the reflector. The electrical connection to the forward pinch seal 12 is the carried along one of those strips, or formed by one of those strips directly, if it is made of metal.

Figure 3:
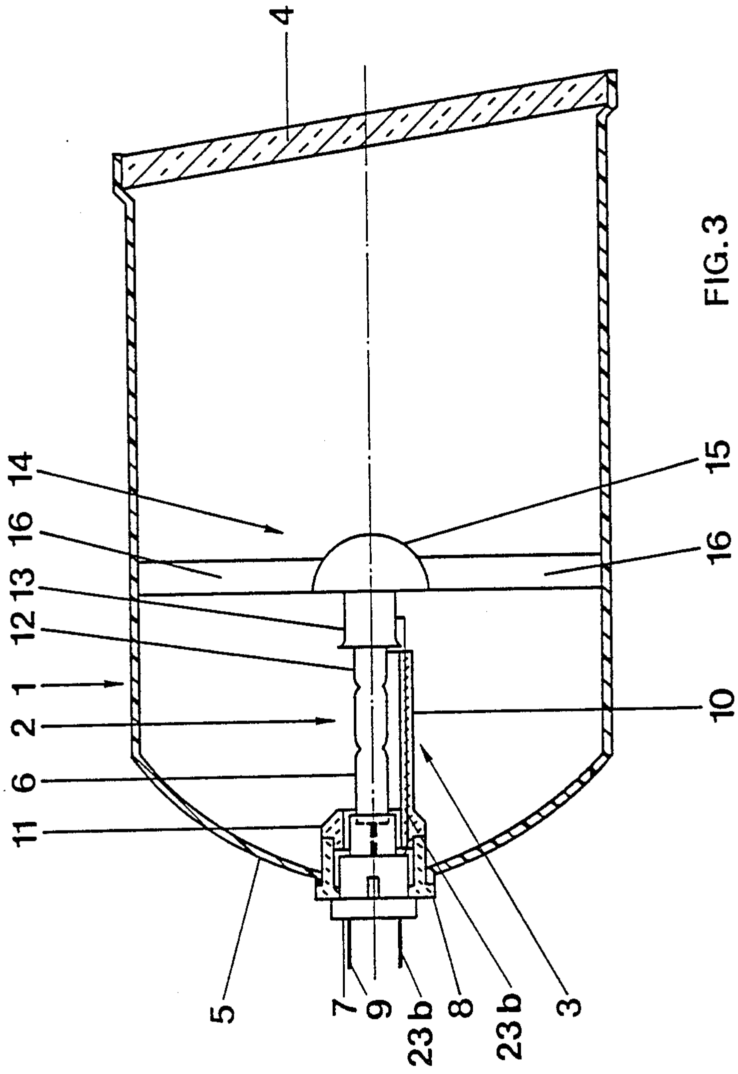
FIG. 3 is a view similar to FIG. 1, and illustrating a modification in which a current supply lead for the forward pinch seal is carried along the lamp to the base.

Various changes and modifications may be made within the scope of the inventive concept. For example, the invention may be used with headlights which do not have a special shielding cap, in which case the strips 16 are merely connected to the sleeve 13 in a suitable manner, without the formation of the essentially hemispherical cap 15 (FIG. 1). Further, well known double-ended discharge lamps can be used in which the current supply 23*b* to the forward pinch seal is returned along the lamp to the base adjacent the rearward pinch seal (FIG. 3), if the current supply leads can be arranged in such a manner that excessive loss of light or shading will not result. The present invention is also applicable to other types of lamp-reflector combinations, and reflectors formed, for example, with profiled surfaces, reflecting segments or facets. In accordance with a feature of the invention, for example, the reflector 1 may be paraboloid-shaped; the cap element 15 then is so dimensioned and shaped that it simultaneously forms a light shield and a light directing or light concentrating element.

What is claimed:

1. Electric lamp-reflector combination, especially automotive headlight, comprising the combination of a reflector (1) defining a rearward end and a forward or light emitting end, and a transparent cover plate means (4) closing off the reflector at the forward, light emitting end with a double-ended discharge lamp (2) positioned in line with the optical axis of the reflector, said lamp having two pinch or press seals (6, 12) located at respective ends thereof;

current supply leads (9, 20) carried through the respective pinch or press seals;

a base (7) located in an opening formed at the rearward end of the reflector, in line with the optical axis of the reflector, and retaining that one of the pinch or press seals of the discharge lamp closest to the rearward end of the reflector, and comprising, in accordance with the invention, lamp retention and guide means (14) rigidly secured to the reflector and positioned to receive that one end of the discharge lamp adjacent the forward pinch or press seal to retain and secure the forward end of the lamp in position, while preventing free movement thereof under conditions of vibration of the lamp-reflector combination.

2. The combination of claim 1, wherein the forward end of the discharge lamp (2) includes engagement means (18) engageable with the lamp retention and guide means (14) and shaped for ease of insertion and matching engagement therewith.

3. The combination of claim 1, wherein the lamp retention and guide means (14) comprises a cylindrical sleeve element (13).

4. The combination of claim 1, wherein the lamp includes a forward sleeve element (18) secured to the lamp in the region of the forward pinch seal (12), surrounding the lamp, and having a conically reduced forward end;

and wherein the lamp retention and guide means comprises a receiving sleeve element (13), positioned and dimensioned for reception of the forward sleeve element (18).

5. The combination of claim 4, wherein the forward sleeve element comprises a metal sleeve element secured to the current supply lead (20) carried through the forward pinch or press seal (12).

6. The combination of claim 5, wherein said receiving sleeve element is made of metal; and electrical power supply means connected to said receiving sleeve element for connecting electrical power supply through said receiving sleeve element to the forward sleeve element and hence to the current supply lead (20) connected thereto.

7. The combination of claim 6, wherein said electrical power supply means comprises a cable (23) connected to said receiving sleeve element.

8. The combination of claim 6, wherein said lamp retention and guide means further comprises attachment means (16) secured to the reflector (5) and supporting said retention sleeve element (13) in position;

and wherein the attachement means, at least in part, are made of metal and form said electric power supply means.

9. The combination of claim 1, wherein the lamp retention and guide means (14) comprises a cylindrical sleeve element (13);

and further including narrow holding strips (16) extending radially from said cylindrical sleeve element (13) and secured to an inner wall of the reflector (5).

10. The combination of claim 6, wherein the lamp retention and guide means (14) comprises a cylindrical sleeve element (13);

further including narrow holding strips (16) extending radially from said cylindrical sleeve element (13) and secured to an inner wall of the reflector (5);

and wherein at least one of the holding strips (16) is made of metal and forms said electrical power supply means.

11. The combination of claim 4, wherein the lamp retention and guide means (14) comprises a cylindrical sleeve element (13);

further including narrow holding strips (16) extending radially from said cylindrical sleeve element

(13) and secured to an inner wall of the reflector (5);

and wherein said electrical power supply means comprises a cable (23) electrically coupled to the forward sleeve element (18) and guided along one of said holding strips (16).

12. The combination of claim 4, wherein the receiving sleeve element (13) comprises electrical no-conductive material;

and an electric power supply means (23) extending into the interior of said receiving sleeve element and electrically coupled to the forward sleeve element (18).

13. The combination of claim 1, wherein an electrical power supply means (23) is provided, extending along the lamp retention and guide means (14) and electrically coupled to that one of the current supply leads (20) extending through the forward pinch seal (12).

14. The combination of claim 1, wherein an electric power supply means (23*b*) is provided, connected to that one of the current supply leads (20) adjacent the forward pinch seal (12), said electric power supply means being carried along the lamp to a lamp base retaining the lamp in position by engagement with the lamp in the region of the rear pinch seal (6).

15. The combination of claim 1, wherein the lamp retention and guide means (14) comprises a receiving sleeve element (13) adapted to receive the forward end of the lamp and a cap element (15) of generally part-spherical shape, having an open portion facing the lamp and retaining said receiving sleeve element in position; and holding strips (16) radially extending from said cap element (15) and secured to an inner wall of the reflector (5).

16. The combination of claim 15, wherein the reflector (1) is generally paraboloid-shaped;

and wherein said cap element is dimensioned and shaped to simultaneously form a light stop for the direct light.

17. The combination of claim 1 wherein said lamp retention and guide means comprise a metal element; and an electrical power line means, connected to said metal lamp retention and guide means for connecting electrical supply therethrough to one (20) of said current supply leads (9, 20) of the discharge lamp (2).

18. The combination of claim 1, wherein the lamp retention and guide means (14) comprises a cylindrical sleeve element (13);

further including narrow holding strips (16) extending radially from said cylindrical sleeve element (13) and secured to an inner wall of the reflector (5);

and wherein at least one of the holding strips (16) is made of metal and forms an electrical power supply means.

19. The combination of claim 1 wherein the lamp retention and guide means (14) comprises a cylindrical sleeve element (13);

further including narrow holding strips (16) extending radially from said cylindrical sleeve element (13) and secured to an inner wall of the reflector (5); and electrical power supply means including a cable (23) electrically coupled to said lamp retention and guide means (14), guided and to one (20) of said current supply leads, and guided along one of said holding strips (16).

* * * * *